Patented June 18, 1935

2,005,184

UNITED STATES PATENT OFFICE 2,005,184

FRUIT COATING METHOD

Thomas W. W. Forrest, Fresno, Calif., assignor to Sun-Maid Raisin Growers of California, a corporation No Drawing. Application June 23, 1933, Serial No. 677,265

3 Claims. (Cl. 99—8)

This invention relates generally to methods and materials for the coating of partially dehydrated or "dried" fruits such as raisins, figs, dates and the like, and to products to which may result from the application of such methods.

In the past it has been common to apply coatings of various materials to partially dehydrated fruits, such as raisins, to make more marketable products. While such coating processes have been used commercially, they have been subject to certain inherent disadvantages, caused mainly by the character of the coating materials employed. For example if a vegetable or mineral oil is utilized as a coating medium, the flavor of the fruit is apt to be impaired. If a simple aqueous solution is utilized, such as one containing fruit pectin, the fruit will not be as free-flowing as is desired for a marketable product.

It is an object of the present invention to provide a method or process which will obviate the disadvantages inherent in prior processes of the above character, which will render the fruit substantially free-flowing, with a fresh appearance which will be maintained over long periods, and which will not detrimentally affect the flavor or palatability of the fruit so treated.

A further object of the invention is to provide a new article of manufacture, consisting of a partially dehydrated fruit treated in accordance with the present method.

Further objects of the invention will appear from the following description in which the preferred embodiments of the invention have been set forth in detail.

In describing my process I shall refer to the treatment of seeded raisins, as the invention is particularly applicable to this fruit. By virtue of the mechanical seeders employed, the skin of a seeded raisin contains a number of punctures thru which the inner juices may extrude. Thus seeded raisins are sticky, and when packed in cartons form a solid mass from which individual raisins can be removed only with difficulty.

In applying my process to seeded raisins, the raisins after being seeded are contacted with a coating material in the form of an emulsion. The emulsion consists of a suitable oil, together with an emulsifying agent and a suitable aqueous solution. While various types of oils can be utilized, I prefer to employ a purified vegetable oil. This oil may have certain characteristics, particularly with respect to flavor, corresponding to the fruit being treated. For example in treating raisins, the oil can be raisin seed oil, suitably purified.

The emulsifying agent utilized in conjunction with the oil should be of such a character as not to detrimentally affect the final product. A suitable emulsifying agent is dextrine, although gum arabic can be employed. The aqueous solution utilized preferably contains an ingredient tending to jell, and for this purpose I have secured good results by using fruit pectin.

The proportions utilized for making up the coating material described above, may of course vary in accordance with the conditions under which the treatment is carried out, and in accordance with the character of the fruit being coated. The following formulas may be given by way of example:—For the treatment of seeded raisins good results can be secured by an emulsion consisting of 16 ounces sugar, 16 ounces fruit pectin, 12 ounces of vegetable oil, 12 ounces of dextrine or equivalent emulsifier, together with 52 gallons of water. For application to chopped raisins, good results have been secured by employing an emulsion consisting of 1¼ ounces sugar, 1¼ ounces fruit pectin, 6 ounces of vegetable oil, 6 ounces of dextrine or equivalent emulsifier, together with one gallon of water. A suitable composition in which prunes can be dipped for coating the same, consists of 1¼ ounces sugar, 1½ ounces fruit pectin, 6 ounces of vegetable oil, 6 ounces of dextrine or emulsifier, and 1½ gallons of water.

Good results have been secured by utilizing so-called corn sugar in the above compositions. It will be noted that these compositions contain no acid for causing the fruit pectin to jell. It has been found that the fruit itself being treated contains a sufficient amount of acid, which acts to cause the fruit pectin to jell, upon application.

Any one of the above named compositions, or compositions of similar character, can be prepared as follows:—The emulsifying agent, in dry powdered condition, such as gum arabic or dextrine, is first mixed with the oil. The fruit pectin, together with the sugar employed, is then dissolved in a certain amount of the water used in the composition. This aqueous pectin solution is then brought to a boiling temperature, after which it is intermixed with the oil containing the emulsifying agent. This material is then further diluted with water.

My coating material may be applied to the fruit in any convenient manner, as by spraying, dipping, contacting the fruit with surfaces wet by the coating material, or by applying the coating material with a brush. In treating seeded raisins a desirable method of application is to apply the coating material simultaneously with the seeding operation. Thus good results have been secured by continuously applying the emulsion to the rubber rolls of raisin seeders, whereby the material is contacted with the raisins being seeded. An additional application can be sprayed upon the raisins while the raisins are being agitated upon a shaker or in a tumbling drum.

Partially dehydrated fruit treated in accordance with the present method forms a product which maintains a fresh glossy appearance, and when the product is packed in cartons, the individual elements of the packed mass can be readily shelled away. In other words the product is made substantially free-flowing. The coating on the product contains only a relatively small amount of oil, and therefore the flavor of the product is not impaired. In fact the coating is not an oil film, like oil coatings employed in the past, but the oil functions as a spreader, so that the remainder of the material applied to the fruit is carried to all exposed surfaces. The coating has a marked healing action on the skin of the fruit, to prevent extrusion of fruit thru punctures in the skin, and serves to maintain a fresh glossy appearance.

I claim:

1. In a method of treating partially dehydrated fruit, contacting the surfaces of the fruit with an emulsion containing oil, water, sugar, fruit pectin, and an emulsifying agent in addition to the fruit pectin.

2. In a method of treating partially dehydrated fruit, contacting the surfaces of the fruit with an emulsion containing oil, dextrine, water, sugar, and fruit pectin.

3. A method of preparing an emulsion for coating partially dehydrated fruit, comprising first forming a mixture of oil and dextrine, and then adding a water solution of fruit pectin and sugar.

THOMAS W. W. FORREST.